May 15, 1923.

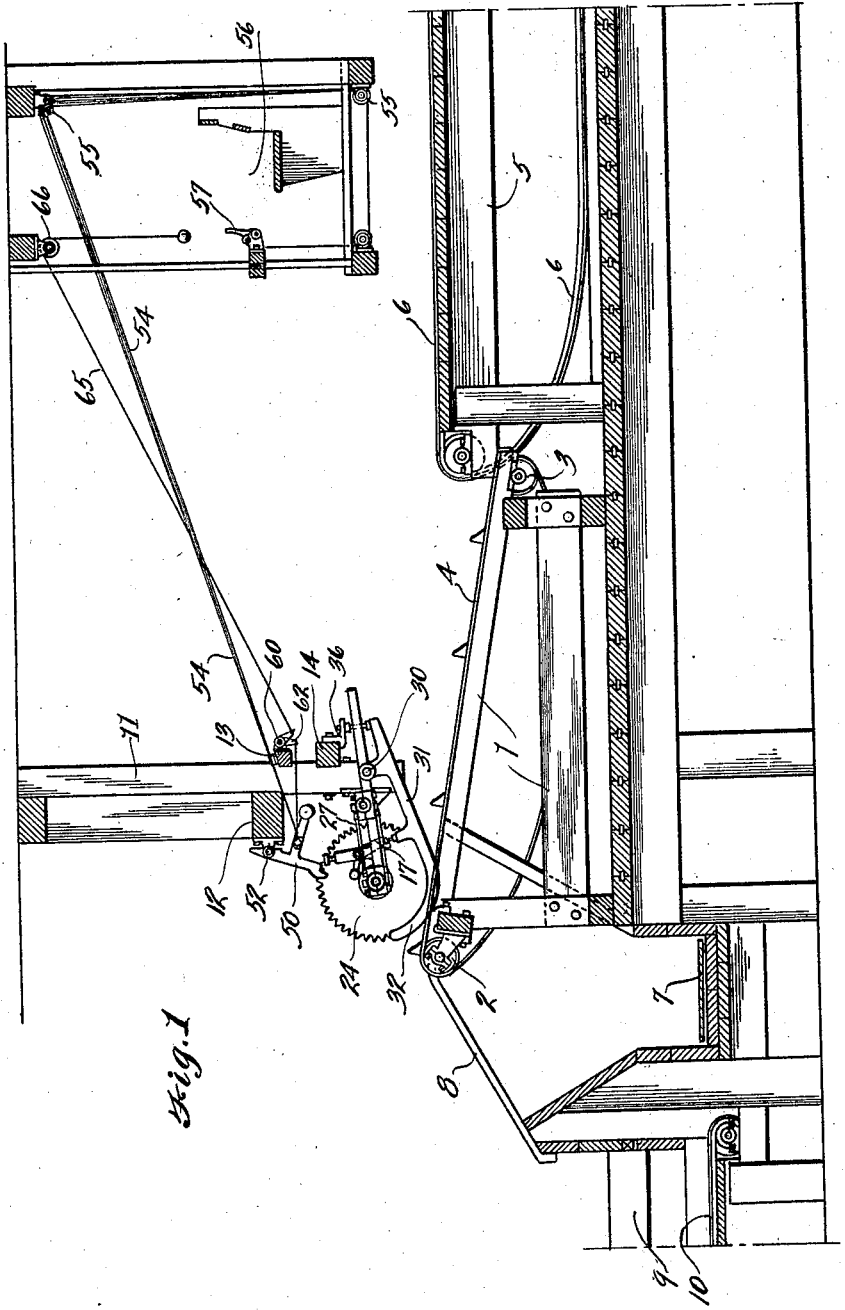

C. W. WILLETTE

AUTOMATIC LUMBER TRIMMER

Filed Nov. 30, 1921

Inventor
CHARLES W. WILLETTE
By Attorney
Richard J. Cook

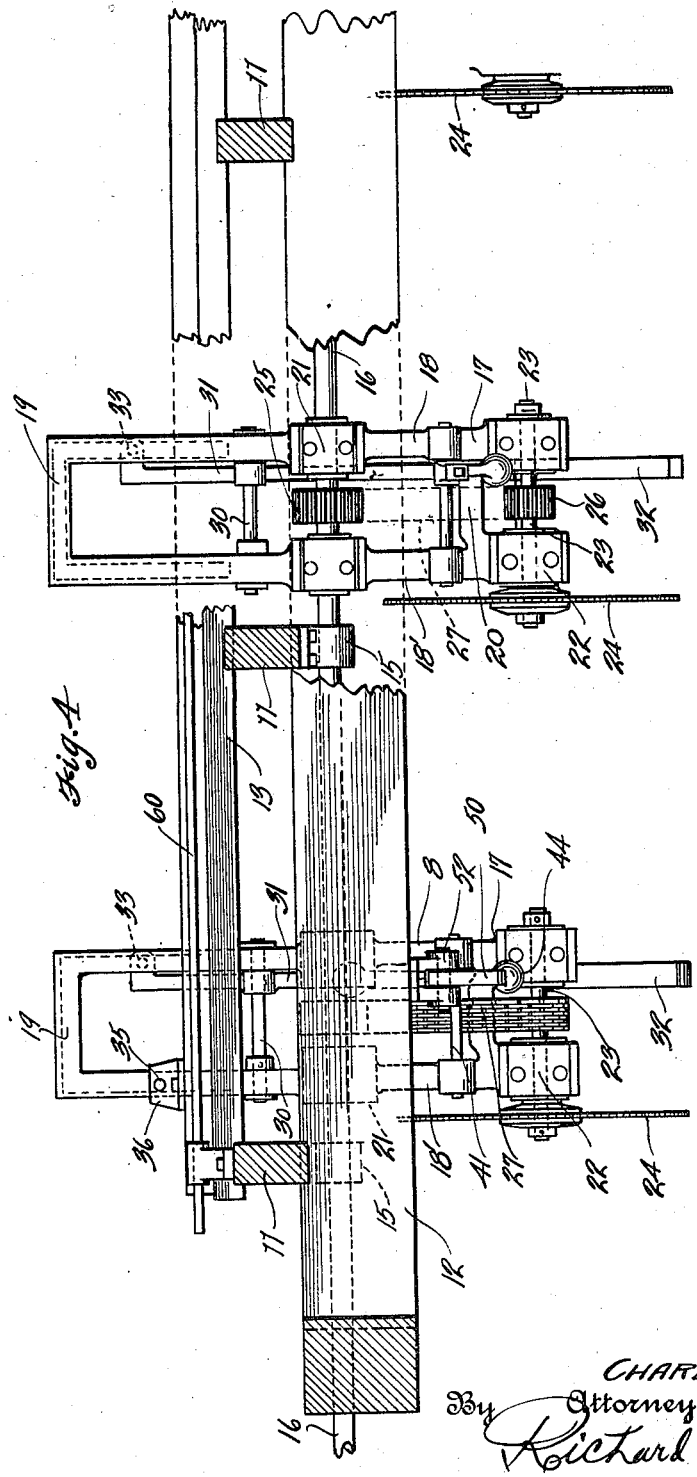

Patented May 15, 1923.

1,454,992

UNITED STATES PATENT OFFICE.

CHARLES W. WILLETTE, OF SEATTLE, WASHINGTON.

AUTOMATIC LUMBER TRIMMER.

Application filed November 30, 1921. Serial No. 518,871.

*To all whom it may concern:*

Be it known that I, CHARLES W. WILLETTE, a citizen of the United States, and a resident of the city of Seattle, county of King, State of Washington, have invented certain new and useful Improvements in Automatic Lumber Trimmers, of which the following is a specification.

This invention relates to improvements in lumber trimmers, and more particularly to mechanism of that character that operates automatically to trim off the ends of lumber to leave the pieces in the clear at standardized length.

It is the principal object of this invention to provide a device of the above character that is truly automatic in its action, which will take lumber of any dimension up to its capacity limit, and will trim both ends of the lumber to leave the pieces at standard lengths.

More specifically, the object of the invention resides in the provision of an automatic lumber trimmer, comprising a plurality of alined saws mounted in pivotally supported frames that are located at regularly spaced intervals above a trimmer table across which the lumber to be trimmed is advanced; each of said frames being equipped with a shoe that is normally locked to its frame, and these are disposed so as to be engaged by lumber advanced across the table, to thereby raise all the saws within the length of the piece except those at the opposite ends which, due to the location of their respective shoes which will not be engaged, will remain in position to trim the ends of the piece.

Another object of the invention resides in the provision of manually operable means for locking desired saws in position to cut a piece of lumber in two or several pieces.

A still further object of the invention is to so construct the saw lifting shoes that the saws will be given a gradual, easy lifting and lowering movement which eliminates shock or jar that is apparent in air lift trimmers. Also to so arrange the shoes that the saws are lifted only sufficiently to permit the piece operated on to pass beneath them instead of the full movement each time, as in air lift machines.

Other objects of the invention reside in the various details of construction and combination of parts which provide for compactness of arrangement, simplicity in operation, and durability in use.

In accomplishing these and other objects of the invention, I have provided the improved details of construction, the preferred forms of which are illustrated in the accompanying drawings, wherein—

Figure 1 is a sectional elevation of an automatic lumber trimmer constructed in accordance with the present invention.

Figure 4 is a plan view showing several saw units of the device.

Referring more in detail to the several views of the drawings, wherein like reference characters designate the same or like parts—

Figure 3:
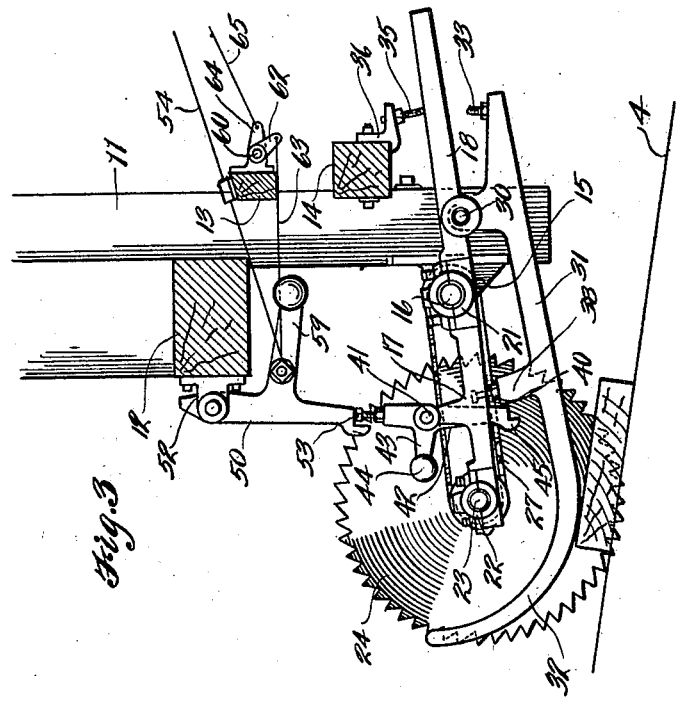
Figure 3 is a similar view, showing the shoe unlocked from the frame, and the saw held in cutting position.

1 designates a suitable frame work forming the trimmer table, which has an upwardly inclined top and is provided at its opposite sides with pulleys 2 and 3 about which conveyer belts 4 operate to advance lumber to the trimming saws. Adjacent the lower side of the table, or frame 1, is another frame 5 over which transfer belts 6 operate to advance lumber onto the conveyer 4, and at the opposite side of the table 1 is a conveyer 7 onto which the trimmed-off ends from the lumber is discharged after leaving the saws. Bars 8 extend downwardly from the discharge end of conveyer 4, across the conveyer 7 upon which the trimmed, or clear, pieces are dumped and along which they will move by gravity onto live rolls 9, then onto a transfer belt 10, whereby they will be carried from the machine.

Suspended above the trimmer table is a saw supporting frame, preferably comprising spaced, vertical members 11, a horizontal connecting beam 12 across the front and two smaller, vertically spaced, horizontal beams 13 and 14 along the back side of the vertical beams, all of which are substantially joined and rigidly braced to serve their purpose.

Secured to the forward side of each of the beams 11, adjacent their lower ends, are bearings 15 and, extending through these, is a shaft 16 which at one end may be connected, in any suitable manner, to a driving motor. This shaft, as will presently be described, is connected with and drives the several saws of the device.

Pivotally mounted upon the shaft 16, at regularly spaced intervals, which in most instances would be two feet between centers, are saw frames 17, each of which consists of parallel side beams 18 and 18′ connected across their rearward ends by an integral bar 19 and adjacent their forward ends by a bar 20. Intermediate their ends the side beams are provided with bearings 21 wherein the shaft 16 is contained, and at their forward ends have bearings 22 wherein saw arbors 23, parallel with shaft 16, are rotatably mounted; these arbors having circular saws 24 mounted thereon at corresponding sides of all the frames, as is shown best in Figure 4.

Sprocket wheels 25 are keyed onto the shaft 16 between the side members of each saw frame, and sprocket wheels 26 are keyed in alinement with these on the arbors 23, and chain belts 27, of the type known as noiseless chains, operate over these wheels to drive the saws.

Extending between the side members of each of the saw frames, just rearwardly of the shaft 16, is a shaft 30 and pivotally supported thereon is a shoe comprising a downwardly and forwardly extending runner 31 having an upwardly turned, radially curved portion 32 at its forward end; This shoe is arranged on the side of the frame opposite that on which the saw is arranged and when the shoe is in locked position, as presently described, the curved portion is concentric with and extends below the saw. At its rearward end, beyond the supporting point, an adjustable bolt 33 is threaded into the runner portion of the shoe, which is adapted to engage against the under side of a side member of the saw frame and in this way provides an adjustable means of limiting the downward movement of the curved end of the shoe beneath the saw. It will be also mentioned here that downward swinging of the forward end of the saw frame is adjustably limited by the engagement of the rearward portion of each frame with the lower end of bolts or studs 35 that are threaded into brackets 36 fixed to the horizontal beam 14.

In order that each saw frame may be individually actuated by its shoe so that its saw will be raised clear of a piece which it is not desired to cut, I have provided the runner portion of each shoe, toward its forward end, with an upwardly extending portion 38 into which a bolt 39 is threaded and locked at any adjusted position by a lock nut 40 thereon. Also, across the forward end of each frame, back of the saw arbor 23, I have mounted a transverse shaft 41 on which a locking lever 42 is pivotally supported. The lower end of this normally engages against the head of the bolt 39 so that upward movement of the shoe effects a like movement of the saw frame and saw.

The lever 42 has a forwardly extending arm 43 integral therewith provided with an enlarged end portion 44 which, by its weight, retains the lower end of the lever against the bolt 39. The lower end of the lever is also provided with a shoulder 45 which engages the side of the bolt head to prevent its swinging inwardly too far.

In order that I may retain any particular saw, or series of saws, in position for cutting, and to release the shoes so that the lumber will be free to pass under them to the saws, I have provided a manually controllable locking arm 50 for each saw. These arms are pivotally mounted at their upper ends in brackets 52 fixed to the horizontal beam 12, with their lower ends normally disengaged from, but adapted to be moved into position to engage the upper ends of bolts 53, that are threaded into the upper end portions of the levers 42, to move these latter levers pivotally sufficiently to disengage their lower ends from the bolts 39 to release their shoes so that they can move upwardly. At the same time, the arm serves as a stop whereby upward movement of the saw frame is prevented and the saw is held in cutting position.

The locking arms 50 are controlled individually by means of cables 54 that are connected thereto and which extend over suitable guide sheaves 55 to an operator's cage, designated at 56, in Figure 1, where they are connected with control levers 57 which the operator, as he desires, may adjust to move any of the arms to, or release them from, holding relation with the saw frames. When an arm of any set is released by its cable, it will be moved outwardly by means of a weighted arm 59 that is formed thereon and extends inwardly therefrom.

Since it is often desired to cut slabs or edgings into four foot stock, I have provided means whereby, for this purpose, every other saw may be locked in position by the pulling of a single cable. In accomplishing this, I have mounted a shaft 60 longitudinally of the trimmer upon the beam 13 and have fixed a series of rocker arms 62 thereto which are connected individually by cables 63 with the locking arms of the selected saws. I have also provided the shaft 60 with a rocker arm 64 with which a cable 65 is connected. This cable is extended over a sheave wheel 66 above the operator and then depends to an accessible position so that it may be grasped and, when pulled downwardly, will rock the shaft 60 to rock all of these locking arms 50 so that their saws will be locked down and their shoes released.

No special means has been shown for driving the conveyers but it is understood that any desired connection can be made with the main driving mechanism, or the conveyers may be driven by an independent driving mechanism.

Figure 2:
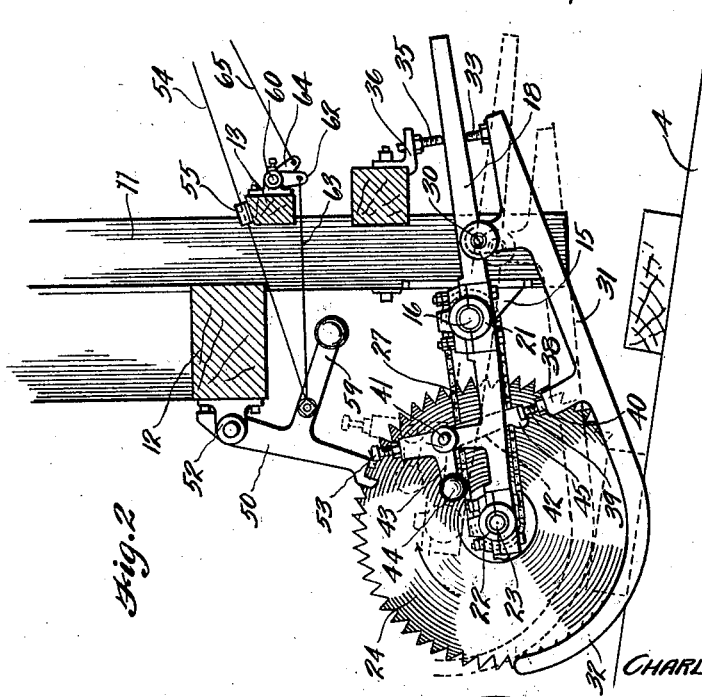
Figure 2 is an enlarged side view of one of the saw units, showing the shoe locked relative to the frame to cause the saw to be raised by a piece passing beneath the same.

Assuming that the parts of the device are so constructed and are assembled as described, operation of the trimmer would be as follows:

The lumber to be trimmed is advanced by the transfer 6 onto the trimmer table 1 and is carried by the conveyer belts 4 toward the saws 24. Normally, the parts of each saw unit, except the one at the extreme left, in left hand trimmers as shown, in this layout, are in the position as shown in Figure 2, wherein the shoe is shown locked with respect to the saw frame and the latter is free to move upwardly. The saw at the left end of a set is normally held down and the only particular precaution to be taken by the operator is to see that that end of the lumber to be trimmed will be cut off without too much waste. This precaution being taken, the lumber, under ordinary circumstances, will be automatically taken care of, that is, trimmed to one of the different lengths provided for, depending upon its own length. For example: If a piece of lumber being forwarded to the saws is of a length greater than the distance between the first and second saw, but shorter than the distance between the first saw and the shoe which lifts the second saw, said lumber would be cut to the minimum length; that is, a length equal to the distance between the first and second saws. If, on the other hand, the lumber is of a greater length than the distance between the first saw and the raising shoe of the second saw, the runner portion of the second shoe will be forced upwardly and the piece will pass under without being cut. If the end of the piece nearest the second and third saws had extended sufficiently far to have been in the path of the latter saw but not sufficiently far to have been in the path of the raising shoe of the last saw, the lumber would then have been trimmed, or cut, to a length equal to the distance between the first and third saws, as will be understood.

Occasionally a piece of lumber is found having a very irregular end, a bad knot, or is otherwise imperfect, which, if left wholly to the machine, would not be satisfactorily operated upon: As, for instance, if a large knot were present in a piece of lumber a few inches inside of the saw which was about to trim its end nearest the automatic saws, it is desirable to let down the nearest adjacent saw which will cut off that portion of the lumber having the knot. For effecting this operation, I have provided the individual control cables for releasing any of the selected saws.

When it is desired to cut slabs, or edgings, into four-foot lengths, the operator simply pulls the cable 65 which unlocks every other shoe which permits these shoes to raise without lifting their saws, and in unlocking the shoes, the saw frames are automatically locked down and the cutting is absolutely assured. Release of the cable again automatically locks the shoes to the saw frames.

As will be readily seen, this design and arrangement relieves the operator of considerable manual labor ordinarily required in this work and gives him more time to devote to careful grading of lumber by making cuts that will give the greatest amount of uppers.

By supporting the operators cage above the conveyer table, as shown in Figure 1, and extending the operating cables 54 above the work and back of the operator, thence downwardly to the floor of the cage and up to the operating levers therein, I have provided a construction that gives a clear opening between the operator and the trimmer table and unobstructed view of the lumber to be trimmed.

For the purpose of simplifying the work, I have provided the operating means for converting the trimmer into a slab slasher, so that there can be no liability of confusing the operator, and thus slashing of good lumber or failing to properly slash slabs and edgings.

Another feature to be noted is that the saw frames are nearly balanced, having sufficient weight on the saw ends to keep them normally in place for trimming. Also the shape of the shoes provided for each saw set insures an easy movement for raising and lowering their saw without shock or jar, and there is no liability of the saws kicking the lumber back since the shoes effectively hold it in place until trimmed.

Having thus described my invention what I claim as new therein and desire to secure by Letters Patent, is:

1. The combination with a lumber conveyer and an overhanging structure, of a horizontal, driven shaft supported from said structure, a saw frame pivotally mounted upon the said shaft, a saw mounted within the frame, means connected with the shaft for driving the saw, a lifting shoe pivotally fixed to the saw frame with an end portion thereof extended within the path of lumber advanced by the conveyer, a lever pivotally mounted on the saw frame having its lower end normally engaging a part of the shoe whereby upward movement of the latter effects like movement of the saw frame, a locking arm pivotally fixed to the supporting structure with its lower end normally disengaged from the locking lever, and means for actuating the locking arm into engagement with the latter to thereby retain the saw frame against upward movement and to cause said lever to be moved pivotally sufficiently to cause it to disengage the shoe so as to permit free pivotal movement of the latter.

2. The combination with a lumber conveyer and an overhanging structure, of a horizontal, driven shaft, supported from said structure, a saw frame pivotally mounted intermediate its ends upon said shaft, a saw mounted within the forward end of the frame, means connected with the shaft for driving the saw, a lifting shoe for the frame pivotally fixed to the latter rearwardly of the driving shaft with its forward end curved concentrically about the axis of the saw and extended below the level of the periphery of the saw in spaced relation thereto and in the path of lumber advanced by the conveyer, means normally locking the shoe with respect to the saw frame, means on the supporting structure for limiting the downward movement of the saw, and a locking arm operable to simultaneously lock the saw frame against upward movement and to free the shoe from locked relation with the saw frame.

3. The combination with a lumber conveyer and an overhanging supporting structure, of a horizontal, driven shaft supported from the said structure, a saw frame pivotally mounted on the shaft to swing in a vertical plane at one end, a saw arbor mounted within the swinging end of the frame, a saw fixed to the arbor, a sprocket wheel on the arbor, a sprocket wheel on the driven shaft, a sprocket chain operating about the sprockets to drive the saw, a saw lifting shoe pivotally mounted on the frame with an end portion extended within the path of lumber advanced by the conveyer, a lever pivotally mounted on the saw frame with its lower end normally positioned to be engaged by the shoe whereby upward movement of the latter effects a like movement of the saw frame, a locking arm pivotally fixed on the supporting structure and normally disengaged from the locking lever and means connected with said arm whereby it may be moved to engage the upper end of the locking lever to thereby retain the saw frame against upward movement and to move the lever sufficiently to effect the release of the shoe.

4. A device as set forth in claim 3 wherein the locking lever and locking arm are provided respectively with laterally extending weighted arms whereby the lever is normally retained in position to engage the shoe and the locking arm is normally retained disengaged from the locking lever.

5. A machine of the class described comprising, in combination, a lumber conveyer, an overhanging structure, a horizontal driven shaft supported from the structure, a saw frame pivotally supported intermediate its ends on said shaft to extend forwardly and rearwardly thereof, a saw mounted within the forward end from the shaft, a lifting shoe for the frame pivotally fixed to the latter with its forward end portion extended to be engaged by lumber advanced to the saw, an adjustable stop fixed to the supporting structure adapted to be engaged by the rearward end of the saw frame to limit the downward movement of the saw, an adjustable abutment stub on the forward end of the shoe, a locking lever pivotally mounted on the saw frame with its lower end normally positioned to be engaged by the adjustable abutment on the shoe, and a locking arm pivotally fixed to the supporting structure and movable into a position to engage said locking lever to thereby retain the saw frame against upward movement and to a further advanced position to rock the locking lever to effect the release of the shoe from the frame.

6. In a construction of the class described, the combination with a lumber conveyer and an overhanging structure, of a horizontal, driven shaft supported by the said structure, a saw frame pivotally mounted intermediate its ends on said shaft comprising spaced apart side rails with connecting end members, a saw arbor mounted within the forward end of the frame, a saw fixed to the arbor, a sprocket wheel on the arbor, a sprocket wheel on the driven shaft, a sprocket chain extended about the sprockets to drive the saw, a shaft fixed between the rails rearwardly of the driving shaft, a shoe pivotally supported intermediate its end upon said shaft with its forward end curved concentrically about the saw arbor and extending beneath the level of the periphery of the saw, an adjustable stud threaded into the rearward end of the shoe engageable with a rail of the saw to limit the downward movement of the shoe, an adjustable stud threaded into a forward end of the shoe, a shaft extended between the rails of the saw frame adjacent its forward end, a lever pivotally mounted on said shaft having a shouldered lower end normally engaged with the adjustable stud, a locking arm pivotally mounted upon the supporting structure and means connected with said arm for moving it to engage the locking lever to actuate the latter to release the shoe and to retain the saw frame against upward movement.

7. A machine of the class described comprising, in combination, a lumber conveyer, an overhanging supporting structure, a horizontal drive shaft supported from the structure, a plurality of saw supporting frames pivotally mounted in spaced apart relation on the said shaft, saws mounted within the swinging ends of said frames, means connected with the shaft for driving the saws, lifting shoes pivotally fixed to the saw frames having end portions extended below into the path of lumber advanced to the saws, means for normally locking the shoes with respect to the saw frames so that upward movement of the shoes effects like movement of the saws, individual locking arms pivotally fixed to the supporting structure normally disengaged from the locking levers, and means for selective or individually actuating the locking arms into engagement with the locking levers, for the purpose set forth.

8. A machine of the class described comprising, in combination, a lumber conveyer, an overhanging supporting structure, a horizontal drive shaft supported from the structure, a plurality of saw supporting frames pivotally mounted in spaced apart relation on the said shaft to trim lumber at standard lengths, saws mounted within the swinging ends of said frames, means connected with the shaft for driving the saws, lifting shoes pivotally fixed to the saw frames having end portions extended into the path of lumber advanced to the saws, means for normally locking the shoes with respect to the saw frames so that upward movement of the shoes effects like movement of the saws, individual locking arms pivotally fixed to the supporting structure normally disengaged from the locking levers but movable into engagement with the latter to retain the saw frames against upward movement and to cause the said levers to thereby be disengaged from the shoes, a rocker shaft mounted on the supporting structure, rocker arms fixed to the said shaft, means connecting the rocker arms with every other one of the locking arms and means for actuating the rocker shaft.

9. A machine of the class described comprising in combination, a lumber conveyer, an overhead supporting structure, a horizontal, driven shaft supported from said structure, a plurality of saw supporting frames pivotally mounted in spaced relation on said shaft for the trimming of lumber at standard lengths, saws operatively mounted on said frame, means for driving the saws from the supporting shaft, lifting shoes for each saw frame, means for normally locking the shoes with respect to the saw frames, locking arms movable into position for retaining the saw frames and operable to effect the release of said shoes, individual operating cables for each of the locking arms operable from an operator's cage located at centralized position, a rocker shaft fixed to the supporting structure, rocker arms fixed to the rocker shaft, means connecting said rocker arms with every other one of the locking arms, and means extending to the operator's cage for actuating the rocker shaft.

Signed at Seattle, Washington, this 25th day of November, 1921.

CHARLES W. WILLETTE.